July 2, 1929.  W. POXON  1,719,448
COAL CONVEYER AND THE LIKE
Filed Aug. 28, 1928   2 Sheets-Sheet 1

INVENTOR
William Poxon
BY
Warren E. Willis.
ATTORNEY

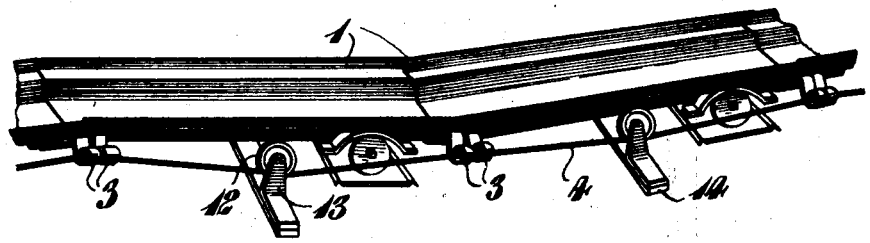
FIG_6
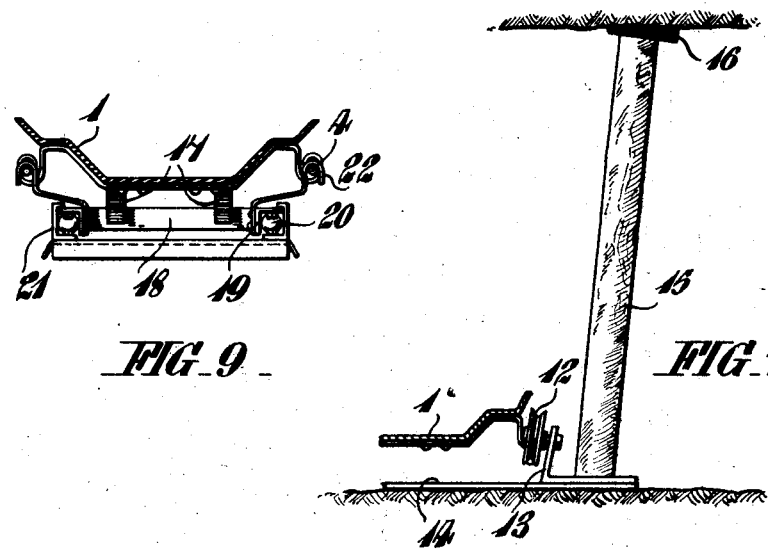
FIG_9   FIG_7
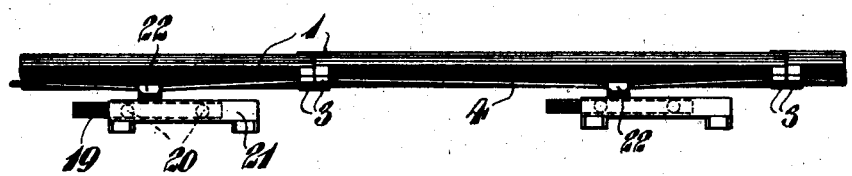
FIG_8

Patented July 2, 1929.

1,719,448

UNITED STATES PATENT OFFICE.

WILLIAM POXON, OF CLOWNE, ENGLAND.

COAL CONVEYER AND THE LIKE.

Application filed August 28, 1928, Serial No. 302,529, and in Great Britain August 30, 1927.

This invention comprises improvements in or relating to coal conveyers and the like, and has more particular reference to that type of conveyer known as a jigger or shaker conveyer which is utilized alongside the coal face in a mine for receiving coal which is hewn or cut and conveying same to the usual pit tubs or the like.

Conveyers of this type are constructed of a series of troughs detachably connected together end to end and each working on its own roller or equivalent cradle and simultaneously jigged lengthwise by mechanism operated from a compressed air or other type of engine. As is well known, after the coal face has been hewn out or cut away to a suitable depth along the length of the conveyer, it is necessary to move the conveyer transversely towards the newly cut face prior to continuing the hewing. By reason, however, of the usual upstanding props or roof supports interposed at intervals between the conveyer and face, the removal of said conveyer to its new position can only be accomplished by passing same between said props in detached sections, thus necessitating the disconnection of the several troughs and the reassembly of same in the new position.

Heretofore, the connection of the trough sections has been usually effected by bolts inserted through aligned sleeves at the trough ends. This, however, is disadvantageous in that it necessitates the manipulation of nuts and locking means therefor in connection with every bolt, and as there are two bolts at each coupling and a considerable number of sections are usually coupled together in each conveyer, it will be appreciated that both the coupling and uncoupling operation occupies considerable time and labour.

Additionally, the coupling bolts frequently become damaged or broken, thus impairing the efficiency of the conveyer.

Another disadvantage which exists in connection with a conveyer having bolted sections as above is that when said conveyer is situated upon undulating or uneven ground, the lack of flexibility between the trough sections prevents certain of the several sections from having a proper bearing upon the roller cradles, thus causing the conveyer to work very noisily. This noisy running increases the danger to those working in the vicinity of the conveyer by reason of the fact that any warning sounds, such for example as the cracking of timber supports, which usually precede a fall of coal or roof cannot be heard.

In the present invention an improved method of and means for coupling together the conveyer sections is provided which entirely obviates the above difficulties and disadvantages.

According to the present invention the coupling of the sections end to end is effected by wire rope or cable, which rope may extend the full length or approximately the full length of the conveyer. Two such ropes are advantageously employed, extending along the conveyer one at or near each side thereof, and the coupling is effected by inserting said rope within axially or longitudinally aligned eyes or sleeves having peripheral openings through which the rope can be inserted into and removed from said eyes or sleeves in a lateral direction.

Means are also provided for securing the ropes in the connected position, and ensuring the operation of the conveyer as a connected whole.

For the purpose of more fully describing the nature of this invention reference will now be made to the accompanying drawings, wherein:—

Figure 6 shows in perspective a portion of a conveyer with one means for positively holding same down upon its roller cradles.

Figure 7 shows in part-sectional end elevation how pit props may be used with the holding down means.

Figure 8 shows in side elevation the application of this invention to a conveyer of the ball frame type.

Figure 9 is a sectional end view of Figure 8.

Figure 1:
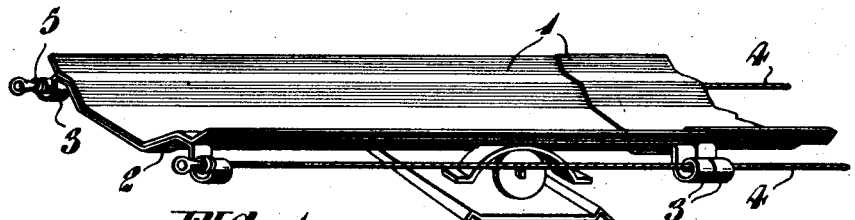
Figure 1 illustrates in perspective one end portion of a conveyer in accordance with this invention.

In one method of carrying out the invention, the conveyer sections 1 are of the usual trough formation and to the underside of each end thereof or to a butting plate fixed beneath said end is riveted a transversely extending metal strap or bar 2 the ends of which are bent to constitute sleeves or eyes 3. If desired, however, these sleeves 3 may comprise separate members secured at each side of the trough or to the butting plate or other convenient part secured to said trough.

The sleeves 3 of the several conveyer trough sections 1 are adapted to be brought into axial or longitudinal alignment, and to connect the troughs closely together, a steel cable 4 of sufficient strength is threaded through the aligned sleeves along the whole length of the conveyer at each side.

At one end of each cable is provided an abutment 5 which may comprise one or more collars or washers threaded on the cable and pressed on to an eyeleted rope capping or equivalent termination. When the cables are in position within the sleeves 3, the ends remote from the abutments 5 are suitably anchored and, by the manipulation of suitable rope tensioning devices, the cables are drawn taut and the trough sections 1 pressed closely together.

Advantageously each trough is formed at one end with an overhanging portion or extension adapted to overlap the adjacent end of the next trough.

Each of the several sleeves 3 is preferably formed with longitudinally extending openings 3ª in its wall through which the cable 4 can be inserted and removed laterally.

Figure 3:
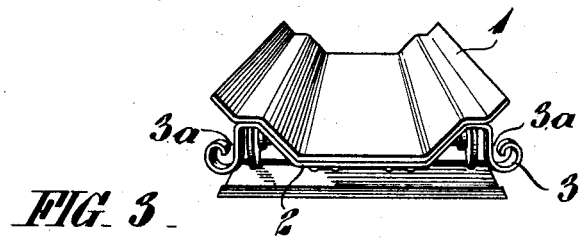
Figure 3 is an end perspective of a trough section.

This may advantageously be effected by forming the sleeves to volute or approximately spiral shape in cross section as shown more clearly in Figure 3, and it will be appreciated that by employing sleeves of this shape, the cables cannot become accidentally displaced therefrom, as it is necessary, in order to remove a cable, to give same an initial movement inwardly towards the trough before said cable can be raised out of the sleeve.

Figure 4:
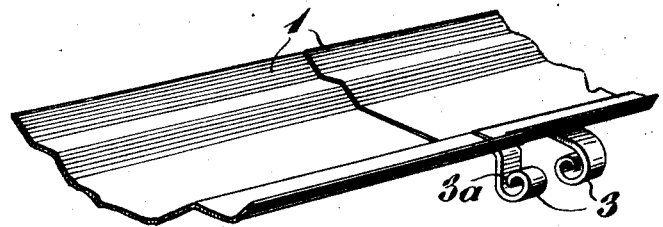
Figure 4 is a perspective view showing a modified method of connecting the trough sections.

In a modified arrangement the peripheral openings into the sleeves situated at the end of any one trough may be in the upper and/or outer part of the sleeve, while the openings in the sleeves at the adjoining end of the next adjacent trough may be formed at an approximately diametrically opposite position, i. e. in the lower and/or inner part. This may be accomplished as shown in Figure 4 by forming the sleeves at one end of a trough by turning over the ends of the strap 2 downwardly and by turning the strap ends at the other end of the trough upwardly.

Additionally, in this last named arrangement to facilitate insertion of the cables in and removal from the oppositely turned sleeves, the sleeves at one end of a trough may be set back a little from the end face of the trough or of the butting plate thereon, thus spacing the aligned sleeves of two abutting troughs a short distance apart, and affording the small degree of lateral play of the cable between the sleeves necessary to enable said cable to be passed first through the opening of one sleeve and then through the oppositely disposed opening of the other sleeve.

Figure 2:
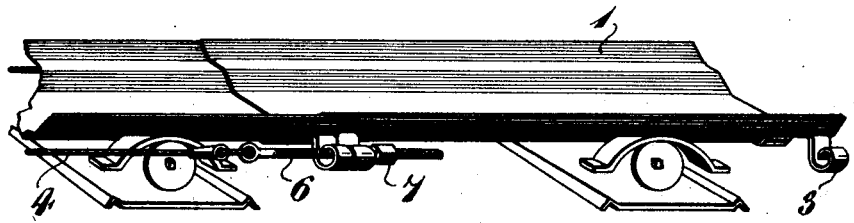
Figure 2 is a perspective view of the opposite end of the conveyer with one form of rope tensioning device.

The tensioning of the cables may be accomplished by providing at the one end a screw 6 (Figure 2) which is inserted through a sleeve 3 of the last trough section and has assembled thereon a nut 7 which is adapted to bear up against the end of said sleeve, the screwing up of said nut exerting a pull upon the cable and drawing same taut.

Figure 5:
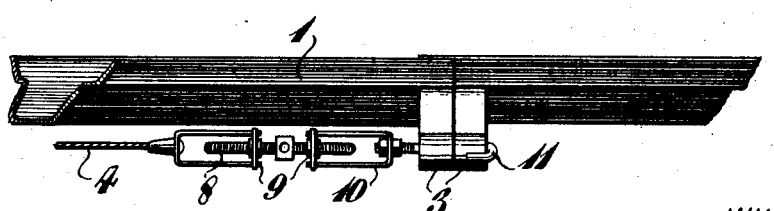
Figure 5 shows an alternative method of tensioning the connecting ropes.

Another method of tensioning the cables is shown in Figure 5 wherein a threaded spindle 8 having right and left hand threads is inserted through two internally threaded collars 9 carried by coupling links 10, one of said links being connected to the cable and the other detachably connected by means such as a hook 11 to a sleeve 3 of the last trough at the one end of the conveyer. By suitable rotation of the screw 8 by means of a tommy bar or other tool the collars 9 are drawn together and the cable tightened.

The cables 4 are for convenience composed of a plurality of comparatively short lengths coupled together by any suitable form of link which will permit of ready connection and disconnection. By forming the cables in separable portions it will be appreciated that the overall length may be adjusted to suit existing requirements.

When, as frequently happens, the conveyer is employed upon a stretch of uneven or undulating ground, the tendency of the coupling ropes when pulled taut is to lift parts of the conveyer from the ground and prevent the proper functioning of the cradle devices beneath said parts. To obviate this and maintain all parts of the conveyor down upon their cradles a pair of grooved pulleys 12 may be installed with each of the troughs (Figures 6 and 7), the pulleys of each pair being preferably disposed transversely opposite to each other beneath the upwardly sloping sides of the trough.

Each pulley 12 is rotatably mounted upon a spindle projecting laterally and inwardly from the upstanding part of a suitable bracket 13, said bracket being conveniently of approximately L shape.

The brackets 13 appertaining to each pair of pulleys 12 may be riveted or otherwise secured to a plate 14 which is disposed on the ground transversely beneath the conveyer or alternatively each bracket 13 carrying a pulley is laid separately upon the ground.

The coupling ropes 4 are passed beneath the several pulleys 12, and each of the several brackets 13 is securely anchored to the ground by any suitable means such for example as by bringing the base of a customary pit prop 15 to bear thereon and subsequently erecting said prop and driving home a wedge 16.

The axle of each pulley 12 is preferably inclined so as to incline the top of said pulley outwards, and by this means the rope groove at the lower part of the pulley is maintained in longitudinal alignment with the sleeves 3, while leaving sufficient clearance between the top of the pulley and the trough side to permit of the passage of a coupling rope 4 when passing said rope on to said pulley.

The invention is also applicable to conveyers of the type wherein the conveyer sections are carried by frames slidable to and fro within a stationary floor frame upon antifriction bearings. In one known arrangement of this class (see Figures 8 and 9) W shaped brackets 17 on the underside of the conveyer sections fit over a cross bar 18 extending between two side angle members 19 of a sliding frame, said angles running on balls 20 assembled between same and side channels 21 of a fixed floor frame.

The sections of this type of conveyer which have hitherto been bolted together, are in this invention connected by ropes 4 threaded through sleeves 3 as before described, and in order to prevent the sections from being accidently lifted or displaced from the sliding frames during working—which displacement is at present a frequent occurence—upstanding hook members 22 are secured to the side angles 19 of said sliding frames, beneath which hooks the ropes 4 are disposed.

Additionally, in connection with conveyers of the roller frame type wherein each conveyer section is bolted to a member carrying rollers running within channels of a fixed floor frame, the necessity of bolting the sections to said rolling members is obviated by providing hooks such as 22 on said members and passing the ropes 4 thereunder.

Instead of employing two side cables as aforedescribed, a single cable may be utilized adapted to extend through eyes or sleeves located beneath the conveyer troughs centrally in the width thereof and preferably at or near the trough ends. This single cable may be composed of one length or of a plurality of coupled portions as before-described.

The coupling of the several trough sections of the conveyer in the manner before-described provides a degree of flexibility between the troughs which enables each trough to bear properly upon its roller path or cradle despite any undulations or unevenness in the ground, and in this way noise in working is minimized. Additionally, considerable time and labour is saved in the dismantling and assembling of the conveyer which can be effected much more expeditiously and with greater ease than is possible with conveyers having bolted troughs.

I claim:

1. In a jigger or shaker conveyer, a series of conveyer sections, said sections being connected together end to end by wire ropes disposed below and at each side of said sections.

2. In a jigger or shaker conveyer, a series of conveyer sections, sleeve members on said sections and wire rope extending through said sleeves to connect the sections together end to end.

3. In a jigger or shaker conveyer, a series of conveyer sections, longitudinally aligned sleeves at each side of each section, and wire rope extending through said sleeves at each side to couple the conveyer sections together.

4. In a jigger or shaker conveyer, a series of conveyer sections arranged end to end, sleeve members fixed at each side and each end of each section, peripheral openings in said sleeves, and wire ropes extending along each side of the conveyer through said sleeves and coupling the sections together.

5. In a jigger or shaker conveyer, a series of conveyer sections, sleeves fixed to each section at each side thereof, said sleeves being of volute formation, and wire rope extending lengthwise of the conveyer through said sleeves and function to couple together the sections end to end.

6. In a jigger or shaker conveyer, a series of conveyer sections, sleeves fixed beneath each section, wire rope extending lengthwise of the conveyer through said sleeves and functioning to couple the sections together end to end, means for anchoring the rope ends and means for applying tension to said rope and for varying the tension.

7. In a jigger or shaker conveyer, a series of conveyer sections arranged end to end, sleeves on said sections, wire ropes extending lengthwise of the conveyer through said sleeves and functioning to couple the sections together, means for anchoring the rope ends, means for applying tension to the ropes, and means coacting with said ropes for holding the sections down upon their runners.

8. In a jigger or shaker conveyer, a series of conveyer sections arranged end to end, sleeves on said sections, wire ropes extending lengthwise of the conveyer through said sleeves and functioning to couple the sections together, means for anchoring the rope ends, means for applying tension to the ropes, and suitably anchored rotatable pulley members beneath which the coupling ropes are passed so as to hold the conveyer sections down on their runners.

9. In a jigger or shaker conveyor, a series of conveyer sections arranged end to end, sleeves on said sections, wire ropes extending lengthwise of the conveyer through said sleeves and functioning to couple the sections together, means for anchoring the rope ends, means for applying tension to the ropes, rotatable pulleys at each side of the conveyer, brackets carrying said pulleys, the coupling ropes being passed beneath said pulleys, and means whereby said pulley brackets are anchored to the floor by pit props.

10. In a jigger or shaker conveyer, a series of conveyer sections arranged end to end, sleeves at each side of each section, wire ropes extending through said sleeves along the conveyer sides and serving to couple the sections together, tensioning means for said ropes, stationary runways beneath the several sections, a member capable of travelling freely along each of said runways but retained from vertical displacement therefrom, said travelling members constituting supports for the conveyer sections, hooks on said travelling members and said hooks engaging with the coupling ropes to hold the conveyer sections down on to the travelling section supports.

WILLIAM POXON.